US012450263B1

(12) United States Patent
Qu et al.

(10) Patent No.: US 12,450,263 B1
(45) Date of Patent: Oct. 21, 2025

(54) SYSTEMS AND METHODS FOR STRATIFICATION OF DATASETS TO RESOLVE ONE OR MORE CONFORMING VALUES IN A MULTI-TENANT SYSTEM

(71) Applicant: Zuora, Inc., Redwood City, CA (US)

(72) Inventors: Weijie Qu, Beijing (CN); Nikki Wong, San Anselmo, CA (US); Sai Ram Rakesh Gorenta, Lathrop, CA (US)

(73) Assignee: Zuora, Inc., Redwood City, CA (US)

( * ) Notice: Subject to any disclaimer, the term of this patent is extended or adjusted under 35 U.S.C. 154(b) by 0 days.

(21) Appl. No.: 18/784,655

(22) Filed: Jul. 25, 2024

(51) Int. Cl.
*G06F 16/00* (2019.01)
*G06F 16/16* (2019.01)
*G06F 16/28* (2019.01)

(52) U.S. Cl.
CPC .......... *G06F 16/285* (2019.01); *G06F 16/168* (2019.01)

(58) Field of Classification Search
CPC .............................. G06F 16/168; G06F 16/285
USPC ......................................................... 707/705
See application file for complete search history.

(56) References Cited

U.S. PATENT DOCUMENTS

2022/0121884 A1\* 4/2022 Zadeh .................... G06N 3/006
707/707

\* cited by examiner

*Primary Examiner* — Alexandria Y Bromell
(74) *Attorney, Agent, or Firm* — Fish & Richardson P.C.

(57) ABSTRACT

A multi-tenant system includes hardware processors that ingest a dataset including transaction records, each of the transaction records including a field value and attribute values of different attributes. The hardware processors test candidate stratification mechanisms on the dataset, each candidate stratification mechanism stratifying the dataset according to a different attribute. The hardware processors determine a test value from field values within each stratification of each candidate stratification mechanism. The hardware processors evaluate each candidate stratification mechanism based on metrics following implementation of the candidate stratification mechanism on the dataset. The one or more metrics indicate a proportion of conforming field values that are within a threshold range of a corresponding test value. The hardware processors select a particular stratification mechanism from the candidate stratification mechanisms based on the one or more metrics, stratify the dataset according to the particular stratification mechanism, and resolve conforming values from the stratified dataset.

12 Claims, 16 Drawing Sheets

FIG. 6A

Top Stratifications 608 → 610

Group by Keys: Business Unit — Functional Currency — Product Family — Product Line — RPC Name — Revenue Category — Transaction Currency Total Compliant Transactions: 1013   Total Transactions: 1346   Overall Compliance: 75.26%

| Business Unit | Functional Currency | Product Family | Product Line | RPC Name | Revenue Category | Transaction Currency |
|---|---|---|---|---|---|---|
| BMC | USD | Subscription | DSOM | Full User Fee | Subscription | USD |
| BMC | USD | Subscription | DSOM | Helix Operations Management - Event Management for Devices | Subscription | USD |
| BMC | USD | Subscription | DSOM | Helix Operations Monitoring and Event Management for Serverless | Subscription | USD |
| BMC | USD | Subscription | DSOM | Helix Operations Management - AIOps Add-on for Devices | Subscription | USD |
| BMC | USD | Subscription | DSOM | Helix Capacity Optimization for Storage Plus on AWS | Subscription | USD |
| BMC | USD | Subscription | DSOM | Helix Operations Management - AIOps Add-on for Serverless Assets (250-Pack) | Subscription | USD |
| BMC | USD | Subscription | DSOM | Helix Capacity Optimization for Networks Plus on AWS | Subscription | USD |
| BMC | USD | Subscription | DSOM | Helix Operations Management - AIOps Add-on for Servers | Subscription | USD |
| BMC | USD | Subscription |  | Profile Overage | Subscription | USD |
| GTMG | USD | Subscription |  | Custom Event Overages | Subscription | USD |

612 →

Group by Keys: Business Unit — Functional Currency — Product Line — RPC Name — Revenue Category — Transaction Currency Total Compliant Transactions: 1011   Total Transactions: 1346   Overall Compliance: 75.11%

Stratifications 11-20 | 378

FIG. 6C

Tenant Interfaces 110

FIG. 6D

SYSTEMS AND METHODS FOR STRATIFICATION OF DATASETS TO RESOLVE ONE OR MORE CONFORMING VALUES IN A MULTI-TENANT SYSTEM

TECHNICAL FIELD

This disclosure pertains to multi-tenant systems and more particularly provides systems and methods for stratification of datasets within a multi-tenant system.

BACKGROUND

Within a multi-tenant system, subscription data within datasets is evaluated for compliance with accounting standards. For example, under Accounting Standards Codification (ASC) 606 and/or International Financial Reporting Standard (IFRS) 15, Standalone Selling Price (SSP) is to be determined using historical selling data for existing resources. SSP will then be used as fair value of the resource to perform relative revenue allocation within a revenue contract.

SUMMARY

Subscription data within datasets is evaluated to conform to accounting standards, such as revenue allocation standards. Because automation may be limited, evaluation sometimes relies on manual trial and error, which is time-consuming and unreliable. As accounting standards have evolved to become more sophisticated in their approaches of analysis, and datasets of subscription data have grown in size and complexity, bottlenecks have arisen in the evaluation of datasets.

For example, ASC 606 and IFRS 15 require determination of an SSP for existing resources, which may encompass goods and/or services. An SSP represents a selling price at contract inception. If an SSP is not directly observable, ASC 606 requires estimation of the SSP. This estimation may be infeasible using manual processes and other current computing processes. Estimation of the SSP may be subject to certain restrictions. For example, an SSP may represent a median value of a transaction, and at least a threshold proportion of transaction values are required to be conforming, within a certain range of the median value.

Embodiments of the present invention overcome these bottlenecks. Embodiments of the present invention implement a stratification system, within a multi-tenant system, that efficiently stratifies a dataset containing subscription data to facilitate evaluation of the subscription data, for example, to resolve one or more conforming SSPs from the dataset. Stratification of the dataset facilitates evaluation because the original dataset likely has event data (e.g., transaction data) of different resources, different markets, and/or other categorizations. An SSP refers to an individual resource within a specific market. To resolve one or more conforming SSPs, the original dataset should be stratified so that the stratifications correspond to different resources and/or different markets. Because an appropriate stratification mechanism specifically for SSP may not be easily recognized, the stratification system tests different candidate stratification mechanisms which utilize different keys as criteria to stratify the dataset. These keys may be indicative of attributes such as resource identifier, geographic location, customer demographics, and/or other attributes. As illustrative examples, one candidate stratification mechanism may include stratifying the dataset according to resource identifier, another candidate stratification mechanism may include stratifying the dataset according to geographic location, and another candidate stratification mechanism may include stratifying the dataset according to a combination of resource identifier and geographic location.

The stratification system may ingest the dataset either via an application programming interface (API) or a different interface, such as a tenant interface. The stratification system may receive one or more constraints pertaining to the dataset and/or to the candidate stratification mechanisms to be tested on the dataset. These constraints may include or indicate a schema mapping of locations of different keys within the dataset, any keys used to stratify the dataset, any divisions of the dataset prior to testing the candidate stratification mechanisms, and/or how the candidate stratification mechanisms are to be evaluated. In some embodiments, prior to testing the candidate stratification mechanisms, the stratification system may normalize and/or reformat the dataset. In some embodiments, the normalizing may include vectorizing the dataset into column vectors and/or row vectors. In some embodiments, if the dataset or a portion thereof is originally in a non-tabular format, the normalizing may include converting the dataset into a tabular format.

In some embodiments, the testing of the candidate stratification mechanisms involves determining, or resolving, for each candidate stratification mechanism, a value and/or one or more metrics from each stratification. In some embodiments, a determined value may include a median value of fields (e.g., field values) within each stratification, or some other measure of central tendency, which may be indicative of an SSP. In some embodiments, the metrics may indicate a degree of accuracy or reliability of a determined value. For example, the metrics may indicate a range of the field values within each stratification, and/or a proportion of conforming field values. Here, conforming field values may be construed as field values within a certain threshold range of the determined value within that stratification. The threshold range may be approximately +/−20 percent, +/−25 percent, +/−30 percent, +/−15 percent, +/−10 percent, or any other range.

The stratification system may select one or more particular stratification mechanisms, out of the candidate stratification mechanisms, according to the metrics and/or according to the constraints. The constraints may indicate a required proportion of conforming field values in each stratification and/or across all stratifications. For example, one constraint may be that a given proportion (e.g., 75 percent) of the field values within each stratification are to fall within a given range (e.g., +/−20 percent) of the determined value. In some embodiments, the stratification system may receive a confirmation and/or further feedback regarding the selected particular stratification mechanisms. The stratification system may output a resolved value, indicative of an SSP, and/or output a report regarding any of the selected particular stratification mechanisms. The resolved value may be implemented in one or more downstream processes such as revenue allocation.

In some embodiments, the stratification system implements an artificial intelligence (AI) algorithm, such as a genetic algorithm. In some embodiments, the genetic algorithm receives, as an input, the original dataset and/or a normalized version of the original dataset, which corresponds to a parent generation. The genetic algorithm may test different candidate stratification mechanisms, and select one or more particular stratification mechanisms, which correspond to a child generation.

In some embodiments, the stratification system may detect and/or remove outliers from one or more stratifications, and determine values and metrics following the removal of the outliers. The stratification system may remove outliers either prior to or after testing candidate stratification mechanisms. The stratification system may remove a limited number of outliers, corresponding to a threshold percentage of field values within the dataset and/or within a stratification.

In this manner, the stratification system may determine and select an appropriate stratification mechanism, without requiring prior knowledge of which stratification mechanism to implement. The selection of an appropriate stratification mechanism may result in resolving of one or more conforming SSPs. Although the discussion focuses on resolving of one or more conforming SSP, embodiments of the invention are not limited to an SSP. Embodiments of the invention may apply to evaluation of any datasets and selecting one or more stratification mechanisms according to constraints. The selected one or more stratification mechanisms may generate and provide different representations of the dataset that facilitate further downstream processes. The selected one or more stratification mechanisms may, additionally or alternatively, resolve other values besides SSPs.

Embodiments of the invention implement a multi-tenant system. The multi-tenant system includes one or more hardware processors; and memory storing computer instructions. The computer instructions, when executed by the one or more hardware processors, are configured to perform ingesting a dataset comprising transaction records, each of the transaction records comprising a field value and attribute values of different attributes, testing candidate stratification mechanisms on the dataset, each candidate stratification mechanism stratifying the dataset according to a different attribute. The computer instructions, when executed by the one or more hardware processors, are further configured to perform determining a test value (e.g., a median value) from field values within each stratification of each candidate stratification mechanism. The computer instructions, when executed by the one or more hardware processors, are further configured to perform evaluating each candidate stratification mechanism based on one or more metrics following stratification according to the candidate stratification mechanism on the dataset. The one or more metrics indicate a proportion of conforming field values that are within a threshold range of a corresponding test value. The computer instructions, when executed by the one or more hardware processors, are further configured to perform selecting a particular stratification mechanism from the candidate stratification mechanisms based on the one or more metrics, stratifying the dataset according to the particular stratification mechanism, and resolving one or more conforming values from the stratified dataset.

In some embodiments, the field value comprises pricing information; and each stratification corresponding to a different attribute value of a particular attribute.

In some embodiments, the resolving of the one or more conforming values comprises resolving a median value from field values within each stratification of the selected particular stratification mechanism, the resolved median values being indicative of standalone selling prices (SSPs).

In some embodiments, the proportion of conforming field values is determined based on one or more constraints indicating a permitted range of deviations of each of the field values from the resolved median value within each stratification.

In some embodiments, the computer instructions when executed by the one or more hardware processors are further configured to perform: receiving an indication of an override of a resolved median value to a modified median value; and recomputing the one or more metrics based on the modified median value.

In some embodiments, the computer instructions when executed by the one or more hardware processors are further configured to perform normalizing the ingested dataset.

In some embodiments, the testing of the candidate stratification mechanisms is based on a genetic algorithm.

In some embodiments, the computer instructions when executed by the one or more hardware processors are further configured to perform: obtaining locations (e.g., columns) of different attributes within the dataset from a schema mapping.

In some embodiments, the instructions when executed by the one or more hardware processors are further configured to perform: removing one or more outliers from the ingested dataset according to one or more clustering algorithms prior to the testing of the candidate stratification mechanisms.

In some embodiments, each transaction record corresponds to a row; the field value corresponds to a column within the row, and the attribute values correspond to different columns within the row.

Embodiments of the invention implement a method implemented by a multi-tenant system. The method comprises ingesting a dataset comprising transaction records, each of the transaction records comprising a field value and attribute values of different attributes; testing candidate stratification mechanisms on the dataset, each candidate stratification mechanism stratifying the dataset according to a different attribute; determining a test value (e.g., a median value) from field values within each stratification of each candidate stratification mechanism; evaluating each candidate stratification mechanism based on one or more metrics following implementation of the candidate stratification mechanism (e.g., stratification according to the candidate stratification mechanism) on the dataset, the one or more metrics indicating a proportion of conforming field values that are within a threshold range of a corresponding test value; selecting a particular stratification mechanism from the candidate stratification mechanisms based on the one or more metrics; stratifying the dataset according to the particular stratification mechanism, and resolving one or more conforming values from the stratified dataset.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIGS. 6A-6B are diagrams illustrating example implementations of tenant interfaces, which are used to define one or more constraints of candidate stratification mechanism testing and evaluation.

FIGS. 6C-6D are diagrams illustrating example implementations of tenant interfaces, which are used to output an SSP and metrics related to the SSP, in accordance with some embodiments of the present invention. FIGS. 6C-6D illustrate reports indicating the SSP and the metrics.

DETAILED DESCRIPTION

Figure 1:
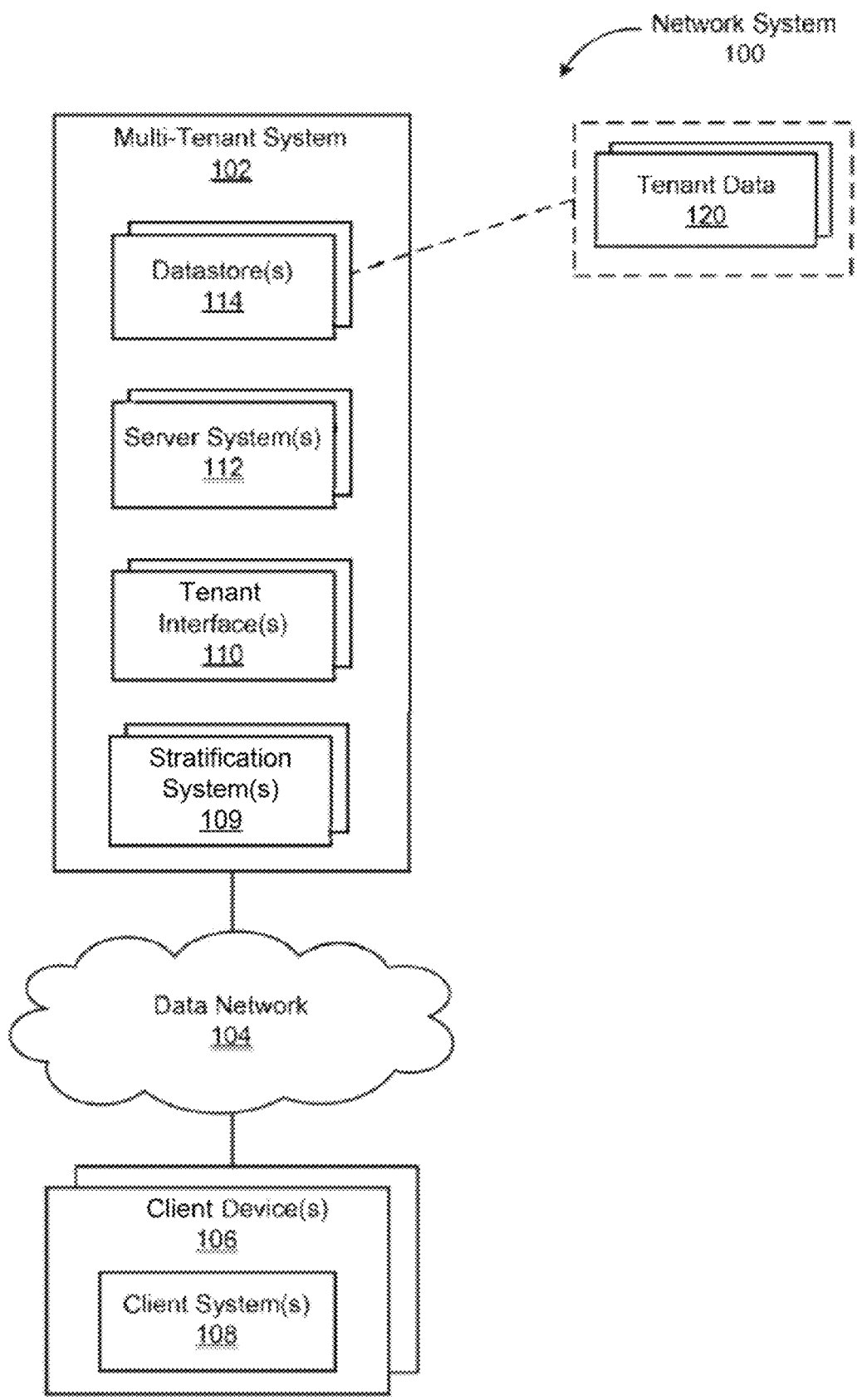
FIG. 1 is a block diagram of a network system for providing cloud-based software-as-a-service (SAAS) services of a multi-tenant system to multiple tenants, in accordance with some embodiments of the present invention.

A claimed solution rooted in computer technology overcomes problems specifically arising in the realm of computer technology.

Embodiments of the present invention implement a stratification system within a multi-tenant system. The stratification system ingests a dataset, such as a transaction dataset, obtains one or more constraints pertaining to the dataset and/or to the stratification to be tested or performed on the dataset, normalizes the dataset, stratifies the dataset according to candidate stratification mechanisms, tests and/or ranks the candidate stratification mechanisms, selects one or more particular stratification mechanisms according to the rankings and the constraints, and resolves one or more values indicative of one or more conforming SSPs from the selected one or more particular stratification mechanisms. In some embodiments, the stratification system generates a report indicating the conforming SSPs and one or more metrics pertaining to the conforming SSPs.

In some embodiments, the stratification system may ingest the dataset either via an application programming interface (API) or a different interface, such as a tenant interface. In some embodiments, the dataset may include records, such as transaction records, related to one or more new or existing subscriptions. The subscriptions may include or be related to one or more resources that are distributed via a distribution source. The distribution source may include a digital application store (e.g., Google Play®, Apple App Store®, Amazon Prime®, Roku®), and/or server that hosts or makes available subscription resources that are provided by a provisioning entity, such as a tenant that coordinates distribution of the resource to subscribers. In some examples, the distribution source may include any other server that distributes the subscription resources. In some embodiments, the dataset may include field values that indicate pricing information, such as prices of resources sold or distributed in each record, and attribute values corresponding to each record. The attribute values may be identified by respective keys. The pricing information may be used to resolve a conforming SSP.

In some embodiments, the stratification system normalizes the dataset into a common format. In some embodiments, the normalizing includes vectorizing the dataset into column vectors or row vectors. In some embodiments, the stratification system may perform deduplication to remove redundant fields. In some embodiments, the stratification system may convert any non-tabular data into a tabular format.

The constraints received by the stratification system may include a schema mapping of locations of different keys within the dataset, any keys used to stratify the dataset, any divisions of the dataset prior to stratification, and/or how the candidate stratification mechanisms are to be evaluated. In some embodiments, the constraints may define a required proportion of conforming field values or fields within each stratification of a candidate stratification mechanism, and/or a required proportion of conforming field values across all stratifications of the candidate stratification mechanism. In some embodiments, conforming field values may be defined as field values that fall within a given range of a determined value (e.g., a median value of the field values within a stratification).

In some embodiments, the stratification system may perform stratifications according to candidate stratification mechanisms, which may be defined according to criteria indicated by different keys or combinations of keys. For example, if a first key indicates a resource identifier, a second key indicates a geographic region, and a third key indicates a subscription type, the candidate stratification mechanisms may be based on any one or any combination of a resource identifier, a geographic region, and a subscription type. In this example, a candidate stratification mechanism defined according to the first key indicating a resource identifier would stratify the dataset such that each stratification includes fields that correspond to a different resource identifier or combination of resource identifiers.

In some embodiments, the stratification system may test and evaluate the candidate stratification mechanisms according to the constraints and/or metrics. In some embodiments, the metrics may indicate a range of the field values within each stratification, a proportion of conforming field values within each stratification, and/or a degree of variance of the field values. In some embodiments, the stratification system may select one or more particular stratification mechanisms, from the candidate stratification mechanisms, that satisfy the constraints, and/or based on the metrics. The stratification system may resolve one or more conforming SSPs from the one or more selected particular stratification mechanisms and output a report that includes the one or more conforming SSPs and related metrics.

FIG. 1 depicts a diagram of an example network system 100 for providing cloud-based software-as-a-service (SAAS) services of a multi-tenant system 102 to multiple tenants according to some embodiments. Examples of the cloud-based SAAS services include data storage, data processing, and business-oriented applications. In some embodiments, each tenant may be a provisioning entity, such as a subscription-based entity or provider of resources (e.g., an internet service provider, a home security system and service provider, a cellular phone service provider, or entertainment content provider). Each tenant may additionally or alternatively include a group of one or more users (e.g., individuals, business entities, customers of the business entities, systems) who share access to the cloud-based services. In one embodiment, a tenant includes a service entity such as AT&T, Netflix, Verizon, and/or the like. A tenant may include one or more resources or services of an entity. For example, AT&T internet resources may be a particular tenant, and AT&T security resources may be another tenant. In some embodiments, the cloud-based SAAS services relate to managing subscriber records, resource and/or service consumption information, billing information, payment information, and/or the like.

The network system 100 includes the multi-tenant system 102 coupled via a data network 104 (e.g., a set of one or more public and/or private, wired and/or wireless networks) to client devices 106. The multi-tenant system 102 includes shared resources to host the cloud-based SAAS services to the tenants. The shared resources may include processors, memory, virtual systems, services, application programs, load balancers, firewalls, and/or the like. As shown, the multi-tenant system 102 includes tenant interfaces 110, server systems 112, datastores 114, and stratification systems 109. Each of the client devices 106 includes a client system 108 that accesses the cloud-based SAAS services hosted by the multi-tenant system 102. In some embodiments, the client systems 108 may be operated by employees (e.g., administrator users) of the provider of the multi-tenant system 102. In some embodiments, the client systems 108 may be operated by employees of the tenant. In some embodiments, the client systems 108 may be operated by end users of the tenant's services.

Each client device 106 may include a desktop, laptop, notebook, tablet, personal digital assistant, smart phone, or other consumer electronic devices incorporating one or more computer components. The client system 108 on each client device 106 may include hardware, software and/or firmware for communicating with the multi-tenant system 102 and accessing the cloud-based services it hosts. Examples of the client systems 108 may include web browsers, client engines, drivers, user interface components, proprietary interfaces, and/or the like.

The multi-tenant system 102 includes hardware, software and/or firmware to host the cloud-based services for the tenants. It will be appreciated that the typical multi-tenant system 102 may offer access to shared resources including systems and applications on shared devices and offer each tenant the same quality or varying qualities of service. In some embodiments, the multi-tenant system 102 does not use virtualization or instantiation processes. In some embodiments, a multi-tenant system 102 integrates several business computing systems into a common system with a view toward streamlining business processes and increasing efficiencies on a business-wide level.

In some embodiments, the multi-tenant system 102 includes a user interface tier of multiple tenant interfaces 110, a server tier of multiple server systems 112, and a datastore tier of multiple datastores 114 for the multiple tenants. In some embodiments, the tenant interfaces 110 includes graphical user interfaces and/or web-based interfaces to enable tenants to access the shared services hosted by the multi-tenant system 102. The tenant interfaces 110 may support load balancing when multiple tenants (and/or multiple customers of the tenants) try to access the multi-tenant system 102 concurrently. The tenant interfaces 110 may additionally or alternatively include an operator interface for use by a systems operator to configure or otherwise manage the multi-tenant system 102. In some embodiments, tenants may input one or more customized fields via the tenant interfaces 110 to be stored within datastores 114 and processed by the stratification systems 109. In some embodiments, each tenant may be associated with a subset of the total tenant interfaces 110 for load balancing.

In some embodiments, the server systems 112 include hardware, software and/or firmware to host the shared services for tenants. The hosted services may include tenant-specific business services or functions, including enterprise resource planning (ERP), customer relationship management (CRM), eCommerce, Human Resources (HR) management, payroll, financials, accounting, calendaring, order processing, subscription billing, inventory management, supply chain management (SCM), collaboration, sales force automation (SFA), marketing automation, contact list management, call-center support, web-based customer support, partner and vendor management systems, product lifecycle management (PLM), financial, reporting and analysis, and/or the like. Similar to the tenant interfaces 110, in some embodiments, the server systems 112 may support load balancing when multiple tenants (and/or multiple customers of tenants) try to access the multi-tenant system 102 concurrently. Further, in some embodiments, each tenant may be associated with a subset of the total server systems 112 for load balancing. In some embodiments, the stratification systems 109 include hardware, software and/or firmware to perform ingesting of a dataset, stratifying the dataset according to candidate stratification mechanisms, testing the candidate stratification mechanisms, selecting one or more particular stratification mechanisms, resolving one or more SSPs from the selected one or more particular stratification mechanisms, and generating an output regarding the resolved SSPs and associated metrics. The resolved SSPs may be used for, and/or linked to, workflow processes such as reporting, analysis, communication, and/or other operations.

In some embodiments, tenant data 120 for each tenant may be stored in a logical store across one or more datastores 114. In some embodiments, each tenant uses a logical store that is not assigned to any predetermined datastores 114. Each logical store may contain tenant data 120 that is used, generated and/or stored as part of providing tenant-specific business services or functions. In some embodiments, the datastores 114 may include relational database management systems (RDBMS), MySQL relational database systems, object-based database systems, and/or the like. In some embodiments, tenant data 120 may be stored across multiple datastores 114, with each datastore dedicated to a particular service (e.g., managing customer records, managing subscription data, managing resource and/or service consumption information, managing billing information, managing payment information, and/or the like). In some embodiments, any of the datastores 114 may store information regarding any updates or event notifications. In some examples, the tenant data 120 may originally have been ingested into the datastores(s) 114 from different sources (e.g., servers that host resources being provisioned by a tenant).

In some embodiments, although the datastores 114, the server systems 112, the tenant interfaces 110, and the stratification systems 109 are shown separately, the separation is shown as merely an example of different aspects of the multi-tenant system 102. Any of the datastores 114, the server systems 112, the tenant interfaces 110, and the stratification systems 109 may be integrated together and/or communicate or collaborate with one another. For example, the server systems 112 and the stratification systems 109 may be integrated into a single system.

In some embodiments, the tenant data 120 may include information regarding resources that are distributed to consuming entities. The information may include statuses of the resources (e.g., which consuming entities are subscribed to the resources), and a provisioning entity (e.g., tenant or tenant identifier) that coordinates distribution of the resources. In some embodiments, the tenant data 120 may include subscription data, such as billing data, subscription status (e.g., active, canceled, suspended, re-activated), and/or geospatial data. Billing data may include billing invoice data (e.g., date of invoices and invoice amounts, overage charge dates and overage charge amounts), payment transaction data (e.g., date of payments, amount of payments), payment methods (e.g., credit card, debit card), payment plan (e.g., annual billing, monthly billing), and/or service plan information (e.g., the name of a service plan). Subscription information may also include a geographic region and/or location associated with a tenant, service, and/or subscriber. In some embodiments, the tenant data 120 may include usage data (e.g., account activity data), such as new subscriptions, changes to subscribed resources and/or services, cancellation of one or more resources and/or services, subscriptions to new resources and/or services, application of discounts, loyalty program package changes (e.g., additional programs and/or services, special rates, and/or the like for loyal customers), reduction or increase of rates for resources and/or services, and/or cancellation of the application. In some embodiments, account activity may include usage of a resource of a subscriber (e.g., what programs or content the subscriber actually watches, what services and what level of consumption the subscriber receives, quality of the resource and/or services, and/or the like).

In some embodiments, the tenant data 120 may be stored in one or more data formats (or, simply, formats). For example, subscription tenant data may be stored in a particular format, and usage tenant data may be stored in another format. As used herein, formats may include data types, variable types, protocols (e.g., protocols for accessing, storing, and/or transmitting data), programming languages, scripting languages, data value parameters (e.g., date formats, string lengths), endpoint locations and/or types, and/or the like.

In some embodiments, the tenant data 120 may be stored in one or more monolithic databases and in one or more custom field databases. As stated above, the tenant data 120 may be stored in different records, e.g., a subscription record, a usage record, a billing record, etc. Each record may be managed by a particular record object, e.g., a subscription record object, a usage record object, a billing record object, etc. Each record object may manage a number of global fields that are common to all of the tenants. For example, the global fields for a subscription record for each and every tenant may include record ID, a username, a subscription identifier, etc. The global fields may be stored in the monolithic database. Notably, different tenants may require different additional fields to store information for different record objects. For example, a first tenant may require two custom fields for a subscription record and one custom field for a usage record. Another tenant may require three custom fields for a subscription record and four custom fields for a usage record. Data for these custom fields can be stored in a custom field database for each record for each tenant.

The monolithic and custom field databases of the multi-tenant system 102 may manage (e.g., create, read, update, delete) tenant data 120 using different formats, different protocols, etc. A monolithic application will control data storage in the monolithic database. A custom field service (microservice) will control data storage in the custom field database. It will be appreciated that as used herein, a "service" may be single service and/or a set of services (e.g., a cluster of services).

The data network (or, communication network) 104 may represent one or more computer networks (e.g., LAN, WAN, or the like) or other transmission mediums. The data network 104 may provide communication between the systems, engines, datastores, components, and/or devices described herein. In some embodiments, the data network 104 includes one or more computing devices, routers, cables, buses, and/or other network topologies (e.g., mesh, and the like). In some embodiments, the data network 104 may be wired and/or wireless. In various embodiments, the data network 104 may include the Internet, one or more wide area networks (WANs) or local area networks (LANs), one or more networks that may be public, private, IP-based, non-IP based, and so forth.

Figure 2:
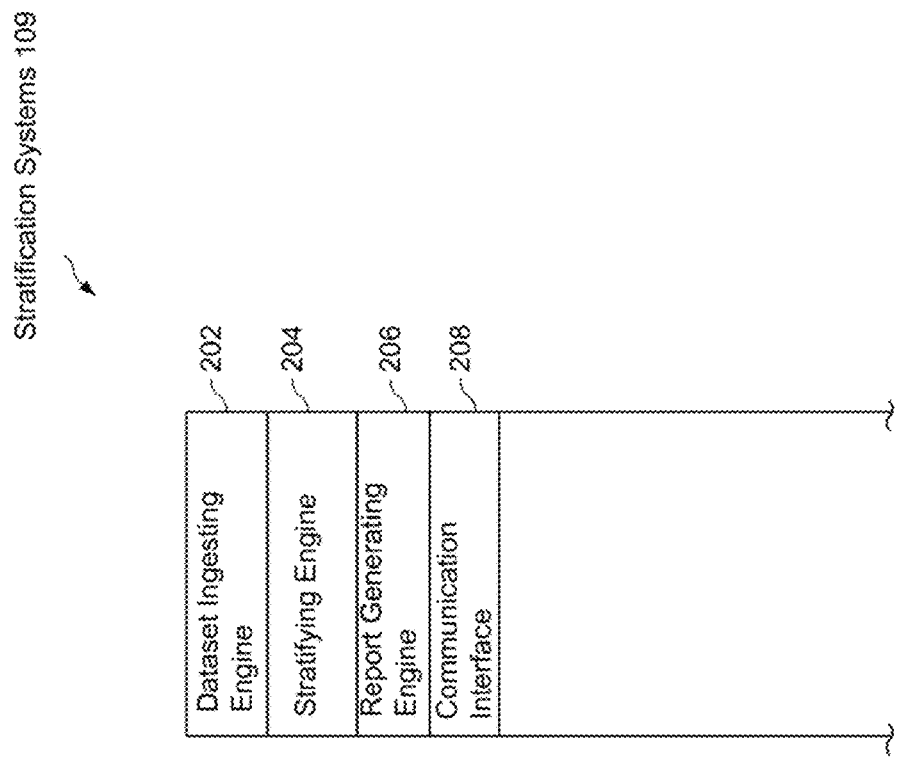
FIG. 2 is a block diagram illustrating details of stratification systems within the multi-tenant system of FIG. 1, in accordance with some embodiments of the present invention.

FIG. 2 is a block diagram illustrating details of the stratification systems 109, in accordance with some embodiments of the present invention. The stratification systems 109 include a dataset ingesting engine 202, a stratifying engine 204, a report generating engine 206, and a communication interface 208. The dataset ingesting engine 202 includes hardware, software and/or firmware capable of communicating with the tenant interfaces 110, the server systems 112, the datastores 114, the client devices 106, and/or other computing interfaces or APIs, to ingest one or more datasets. The ingesting of the datasets may be performed via the tenant interfaces 110, and/or APIs which integrate with other components of the multi-tenant system 102, such as the datastores 114. In some embodiments, the ingesting of the datasets may be in batches. In some embodiments, the dataset ingesting engine 202 may normalize the datasets following ingestion. The normalizing of the datasets may include converting any non-tabular portions or unstructured data into a tabular format or structured data. The normalizing of the datasets may also include converting the datasets into vectorized format in order to facilitate testing of candidate stratification mechanisms.

The stratifying engine 204 includes hardware, software and/or firmware capable of communicating with the tenant interfaces 110, the server systems 112, the datastores 114, the client devices 106, and/or other computing interfaces or APIs, to determine candidate stratification mechanisms with which to stratify the dataset, test and evaluate the candidate stratification mechanisms, and/or select one or more particular stratification mechanisms, as will be further described in FIGS. 3, 4A, 4B, 4C, and 5. In some embodiments, the stratifying engine 204 may test different candidate stratification mechanisms within different portions of the ingested dataset. In some embodiments, the stratifying engine 204 may implement one or more AI algorithms such as a genetic algorithm. The ingested datasets may correspond to a parent generation of the genetic algorithm. The genetic algorithm may output one or more stratified datasets or stratified representations of the dataset, for one or more particular selected stratification mechanisms. These stratified datasets may correspond to a child generation of the genetic algorithm.

The report generating engine 206 includes hardware, software and/or firmware capable of communicating with the tenant interfaces 110, the server systems 112, the datastores 114, the client devices 106, and/or other computing interfaces or APIs, to generate one or more reports regarding the selected one or more particular stratification mechanisms, such as one or more resolved SSPs and associated metrics from the one or more particular selected stratification mechanisms. In some embodiments, the reports may include SSPs corresponding to different products, and/or metrics associated with the SSPs, such as a proportion of conforming field values or fields in each stratification. The communication interface 208 may include APIs and be configured to communicate with the tenant interfaces 110, the server systems 112, and/or the datastores 114.

The stratification systems 109 may repeat the aforementioned process of normalizing, testing and evaluating candidate stratification mechanisms, selecting one or more particular candidate stratification mechanisms, and generating one or more outputs corresponding to the selecting one or more particular candidate stratification mechanisms, for additional datasets and/or additional batches.

Figure 3:
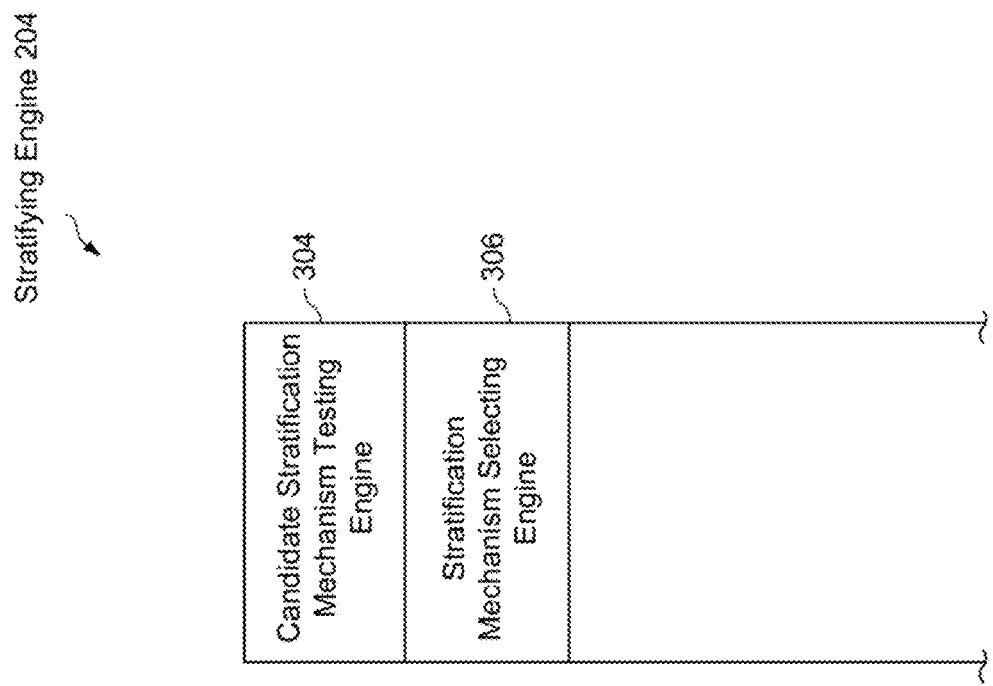
FIG. 3 is a block diagram illustrating details of a stratifying engine of FIG. 2, in accordance with some embodiments of the present invention.

FIG. 3 is a block diagram illustrating details of the stratifying engine 204, in accordance with some embodiments of the present invention. Principles of FIG. 3 may be implemented in conjunction with FIG. 2, and vice versa. The stratifying engine 204 includes a candidate stratification mechanism testing engine 304, and a stratification mechanism selecting engine 306.

In some embodiments, the candidate stratification mechanism testing engine 304 may obtain one or more constraints regarding the ingested datasets and/or regarding candidate stratification mechanisms. The constraints may indicate a schema mapping of where different keys are located within a dataset, any keys used to stratify the dataset, any divisions of the dataset prior to stratification, and/or how the stratification mechanisms are to be evaluated. For example, the schema mapping may indicate particular columns and/or rows that identify or correspond to the keys. These keys may indicate different attributes. For example, if a first key indicates a resource identifier, a second key indicates a geographic region, and a third key indicates a subscription type, the candidate stratification mechanisms may be based on any one or any combination of a resource identifier, a geographic region, and a subscription type. In this example, a candidate stratification mechanism defined according to the first key, or a resource identifier, would stratify the dataset such that each stratification includes fields that correspond to a different resource identifier or a different combination of resource identifiers. Thus, the keys may be used to determine or define which candidate stratification mechanisms to test.

In some embodiments, the constraints may specify a specific key or combination of keys to stratify the dataset. The candidate stratification mechanism testing engine 304 may then test a limited number of candidate stratification mechanisms using the specified key or combination of keys. In some embodiments, the candidate stratification mechanism testing engine 304 may test candidate stratification mechanisms corresponding to keys that have historically been used.

In some embodiments, the constraints may define a lower bound and/or an upper bound for a field value to be considered as conforming. The lower bound and/or upper bound may be defined in terms of permitted variation from a test value, such as a median value, within a stratification. In some embodiments, the constraints may define a required proportion of conforming field values within a stratification. In some embodiments, the constraints may define a minimum number of fields or field values within each stratification.

The candidate stratification mechanism testing engine 304 may, for each candidate stratification mechanism, generate stratified datasets or stratified representations of the dataset 400. The stratified datasets may correspond to different stratifications according to the candidate stratification mechanism. Using the previous example of a candidate stratification mechanism that stratifies according to the first key indicating a resource identifier, a first stratified dataset may include field values that correspond to a first resource identifier, a second stratified dataset may include field values that correspond to a second resource identifier, a third stratified dataset may include field values that correspond to a third resource identifier, and so on. In some embodiments, alternatively, a stratified dataset may correspond to a combination of attribute values. For example, a first stratified dataset may include field values that correspond to either the first resource identifier or the second resource identifier. The candidate stratification mechanism testing engine 304 may evaluate each stratified dataset to determine a value from each stratified dataset, along with one or more metrics. In some embodiments, the value may include a median value of the fields within the stratified dataset. In some embodiments, the metrics may indicate a proportion of the fields that are conforming. As previously alluded to, conforming field values may fall within a given range (e.g., +/−25 percent, or any other percentage) of the determined value.

In some embodiments, the candidate stratification mechanism testing engine 304 may identify and/or remove one or more outliers from a stratified dataset. Following removal, the candidate stratification mechanism testing engine 304 may redetermine a value and one or more metrics of that stratified dataset.

In some embodiments, the stratification mechanism selecting engine 306 may select one or more particular stratification mechanisms in which the metrics satisfy the constraints. In some embodiments, additionally or alternatively, the stratification mechanism selecting engine 306 may select one or more particular stratification mechanisms based on highest performing metrics. In some embodiments, highest performing metrics may be construed as highest proportions of conforming field values, compared to other candidate stratification mechanisms. In some embodiments, additionally or alternatively, the stratification mechanism selecting engine 306 may select one or more particular stratification mechanisms based on a number of stratifications (e.g., a minimum number of stratifications). From any of the selected one or more particular stratification mechanisms, the stratification mechanism selecting engine 306 may resolve a SSP.

In some embodiments, if the stratification mechanism selecting engine 306 determines that none of the stratification mechanisms satisfy the constraints, the candidate stratification mechanism testing engine 304 may indicate that none of the stratification mechanisms satisfy the constraints, and/or output one of more particular stratification mechanisms having highest performing metrics. In some embodiments, the stratification mechanism selecting engine 306 may, additionally or alternatively, remove one or more outliers from a stratified dataset and redetermine the value and one or more metrics following removal. Additionally or alternatively, the candidate stratification mechanism testing engine 304 may define and test additional candidate stratification mechanisms. In some embodiments, the additional candidate stratification mechanisms may be based on a combination of the keys, and/or a combination of existing candidate stratification mechanisms.

Figure 4A:
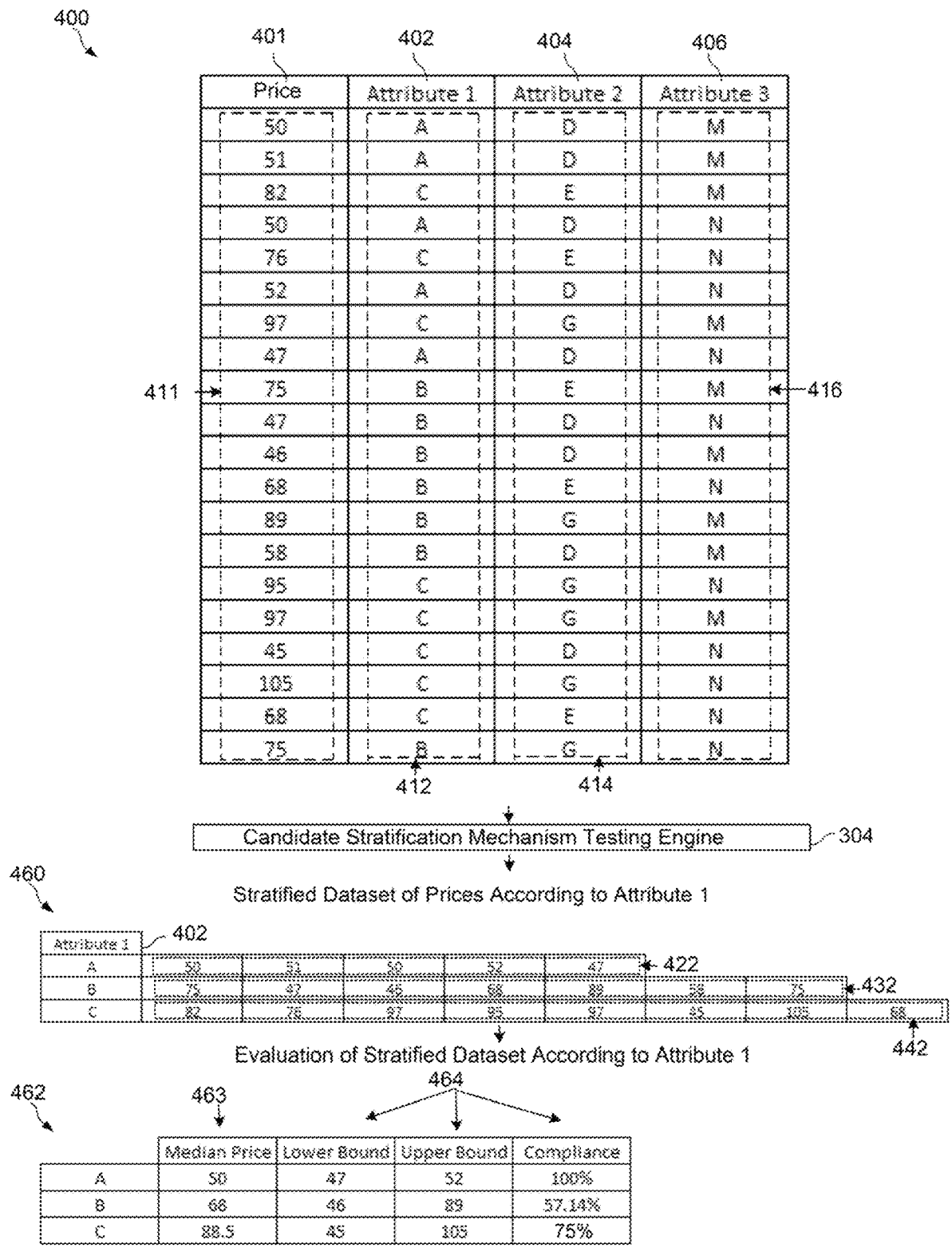
FIGS. 4A-4C are diagrams illustrating example implementations of a candidate stratification mechanism testing engine of FIG. 3, in accordance with some embodiments of the present invention.
Figure 4B:
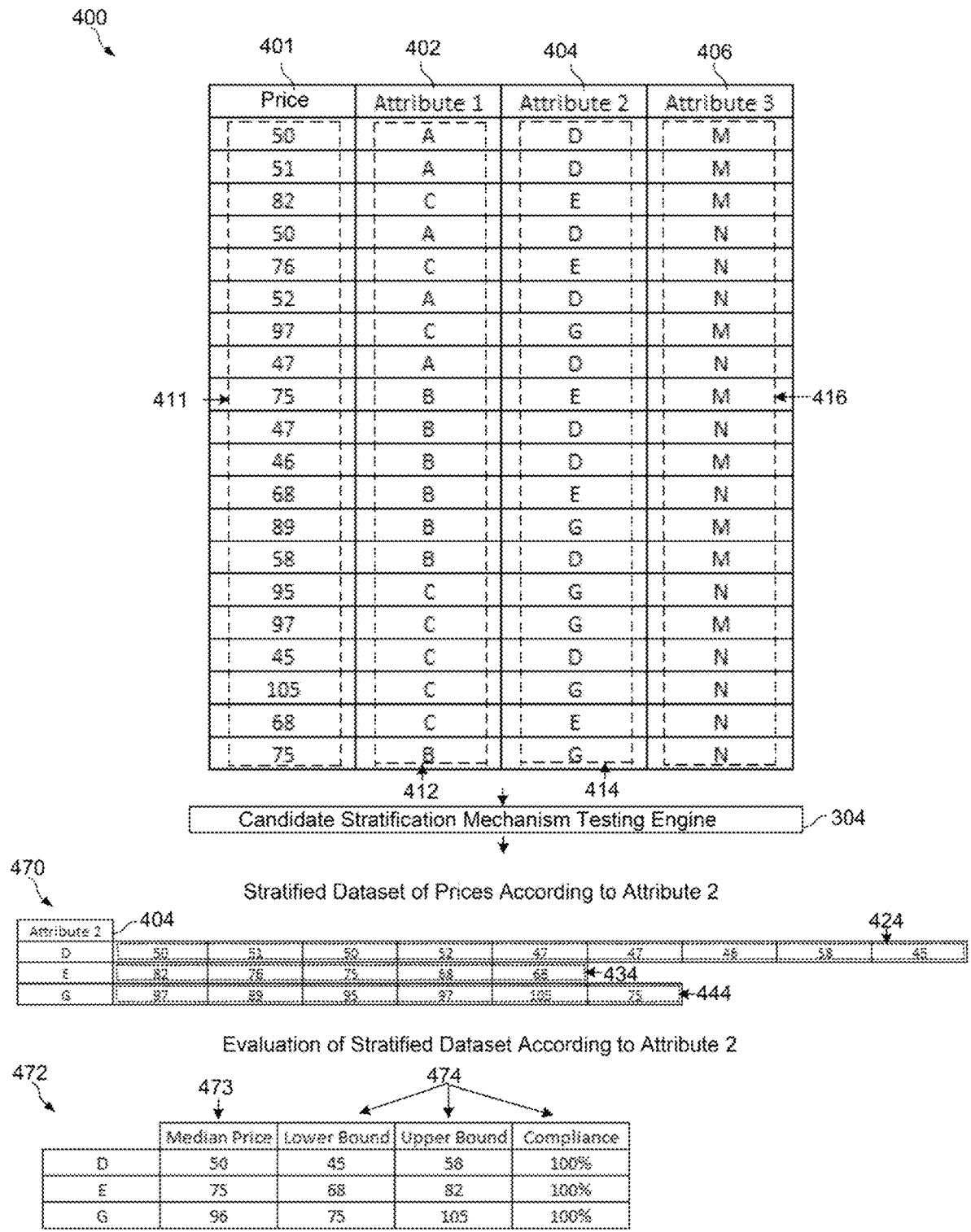
Figure 4C:
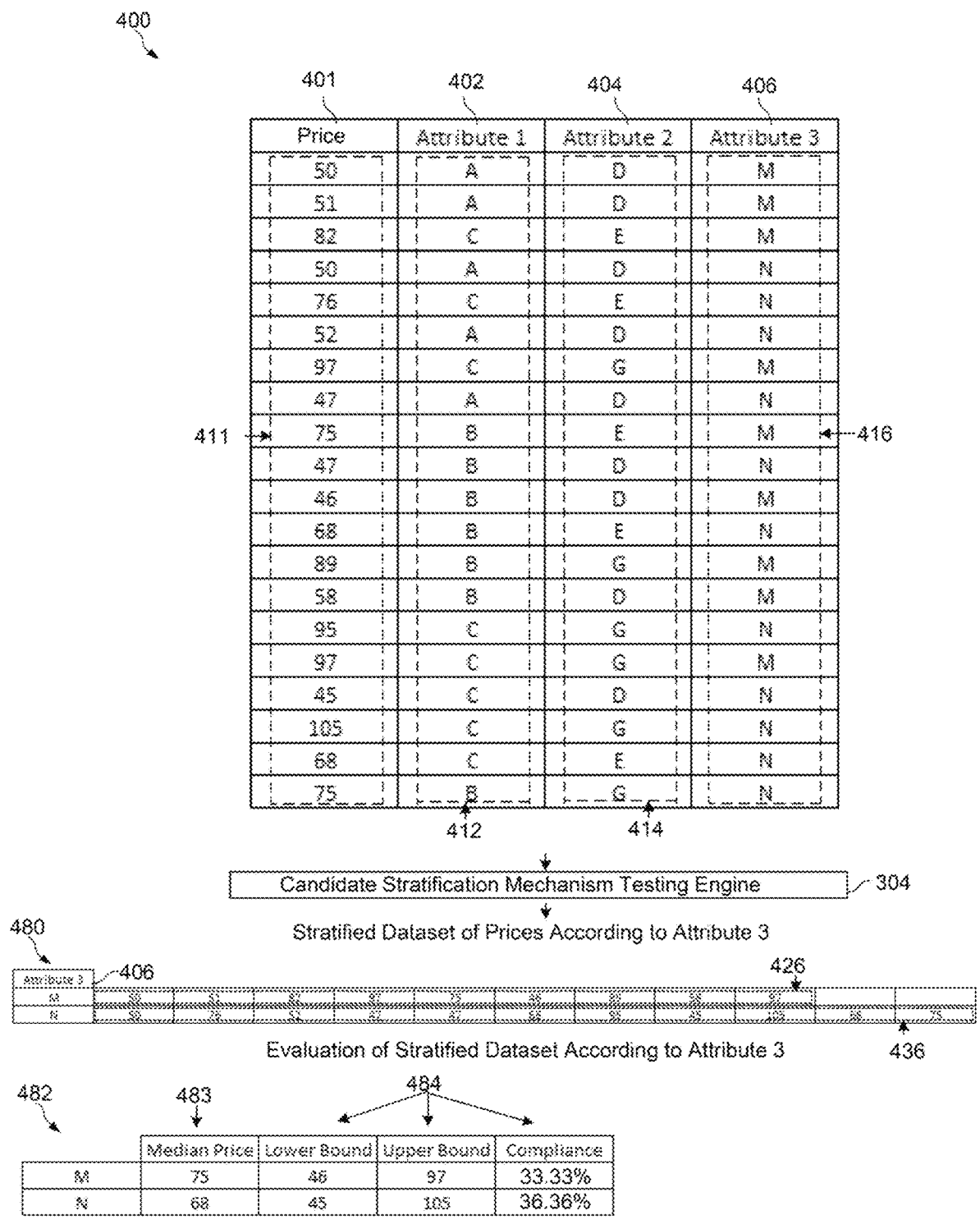

FIGS. 4A-4C are exemplary illustrations of an implementation of the candidate stratification mechanism testing engine 304, in accordance with some embodiments of the present invention. Principles of FIGS. 4A-4C may be implemented in conjunction with principles illustrated in FIGS. 2 and 3, and vice versa. In FIG. 4A, a dataset 400, following ingesting and/or normalizing by the dataset ingesting engine 202, may be tested according to different candidate stratification mechanisms by the candidate stratification mechanism testing engine 304. The dataset 400 may include subscription data, and/or historical transaction records. In some embodiments, each record may correspond to a transaction. In some embodiments, the dataset 400 may be divided up into portions, and each portion may be tested separately. For example, at least some of the portions may be tested according to different candidate stratification mechanisms (e.g., using different keys).

The dataset 400 may include identifiers 401, 402, 404, and 406, which indicate a type of information provided by corresponding field values 411, and attribute values 412, 414, and 416, respectively. The identifier 401 may indicate that the corresponding field values 411 contain pricing information. The identifiers 402, 404, and 406 may include keys, which indicate attributes values that further categorize the transaction record. As a nonlimiting example, the identifier 402 may indicate a first attribute such as a resource identifier. The identifier 402 may indicate that the corresponding attribute values 412 contain information that identifies a type of the first attribute for the corresponding transaction records. Attribute values of "A," "B," and "C" indicate different resource identifiers. As another nonlimiting example, the identifier 404 may indicate a second attribute such as a geographic region. The identifier 404 may indicate that the corresponding attribute values 414 contain information that identifies a type of the second attribute a type of the first attribute for the corresponding transaction records. Attribute values of "D," "E," and "G" indicate different geographic regions. As another nonlimiting example, the identifier 406 may indicate a third attribute such as a subscription type. The identifier 406 may indicate that the corresponding attribute values 416 contain information that identifies a type of the third attribute for the corresponding transaction records. Attribute values of "M" and "N" indicate different subscription types.

In FIG. 4A, the candidate stratification mechanism testing engine 304 tests a particular candidate stratification mechanism that stratifies the dataset 400 according to the first attribute, as indicated by the identifier 402. A stratified dataset 460 is shown, in which each stratification 422, 432, and 442 corresponds to different attribute values of the first attribute. In particular, the stratification 422 includes field values from the dataset 400 corresponding to attribute values of "A." The stratification 432 includes field values from the dataset 400 corresponding to attribute values of "B." The stratification 442 includes field values from the dataset 400 corresponding to attribute values of "C." Alternatively, a different candidate stratification mechanism may define a single stratification to encompass a combination of attribute values, rather than just a single attribute value. For example, one stratification may include field values from the dataset 400 corresponding to attribute values of "A" or "B."

The candidate stratification mechanism testing engine 304 outputs an evaluation 462 which indicates test values, such as median values of the field values in each stratification 422, 432, and 442, and one or more other metrics 464. The test values may indicate potential values of SSP for different resources and/or markets. The other metrics 464 may include, for example, a lower bound, an upper bound, and/or a compliance rate, which indicates a proportion of the field values that conform to the constraints. Here, assume that a field value within +/−20 percent of the median value for that stratification is defined to be conforming. Within the stratification 422, all the field values are conforming because all field values are within 20 percent of the median value of 50. Within the stratification 432, 57.14 percent, or 4 out of 7, field values are conforming, giving a compliance rate of 57.14 percent. Specifically, the field values 75, 68, 58, and 75 are conforming, while the field values 47, 46, and 89 are nonconforming because those field values deviate by more than 20 percent from the median value of 68. Within the stratification 462, 87.5 percent, or 6 out of 8, field values are conforming. Specifically, all field values except for the field values 45 and 68 are within 20 percent of the median value of 88.5.

In some embodiments, the candidate stratification mechanism testing engine 304 may identify and/or remove one or more field values that constitute outliers. In some embodiments, if a field value deviates from the median value by more than a threshold amount or proportion, then that field value may constitute an outlier. As a specific illustrative example, the candidate stratification mechanism testing engine 304 may identify and remove the field value "45" within the stratification 442. Following removal of the field value "45," the candidate stratification mechanism testing engine 304 may output an updated evaluation, with an updated median value and updated metrics.

In some embodiments, if the candidate stratification mechanism testing engine 304 identifies that one or more stratifications have compliance rates that fail to conform to the constraints, then the candidate stratification mechanism testing engine 304 may test additional stratification mechanisms for those failed stratifications. For example, the candidate stratification mechanism testing engine 304 may identify that the stratification 432 has a 57.14 percent compliance rate which fails to satisfy the required compliance rate of 75 percent, and test additional stratification mechanisms for the stratification 432.

The candidate stratification mechanism testing engine 304 repeats this process for a different candidate stratification mechanism, which stratifies the dataset 400 according to the second attribute, as indicated by the identifier 404 in FIG. 4B. A stratified dataset 470 is shown, in which each stratification 424, 434, and 444 has field values corresponding to different attribute values of the second attribute. In particular, the stratification 424 includes field values from the dataset 400 corresponding to attribute values of "D." The stratification 434 includes field values from the dataset 400 corresponding to attribute values of "E." The stratification 444 includes field values from the dataset 400 corresponding to attribute values of "G."

The candidate stratification mechanism testing engine 304 outputs an evaluation 472 which indicates test values, such as median values of the field values in each stratification 424, 434, and 444, and one or more other metrics 474. The candidate stratification mechanism testing engine 304 determines that all the field values are conforming within each stratification 424, 434, and 444.

The candidate stratification mechanism testing engine 304 repeats this process for a different candidate stratification mechanism that stratifies the dataset 400 according to the third attribute, as indicated by the identifier 406 in FIG. 4C. A stratified dataset 480 is shown, in which each stratification 426 and 436 has field values corresponding to different attribute values of the third attribute. In particular, the stratification 426 includes field values from the dataset 400 corresponding to attribute values of "M." The stratification 436 includes field values from the dataset 400 corresponding to attribute values of "N."

The candidate stratification mechanism testing engine 304 outputs an evaluation 482 which indicates test values, such as median values of the field values in each stratification 426 and 436, and one or more other metrics 484. The candidate stratification mechanism testing engine 304 determines that 33.33 percent, or 3 of 9 field values, within the stratification 426 are conforming, meaning that 3 of 9 field values are within +/−20 percent of the median value 75. The candidate stratification mechanism testing engine 304 determines that 36.36 percent, or 4 of 11 field values, within the stratification 436 are conforming.

In some embodiments, the candidate stratification mechanism testing engine 304 may test and evaluate a combination of the candidate stratification mechanisms as illustrated in FIGS. 4A, 4B, and 4C by using a combination of keys, which would stratify the dataset 400 into smaller stratified datasets. For example, the candidate stratification mechanism testing engine 304 may test a candidate stratification mechanism that uses any combination of the keys 402, 404, and/or 406. For a candidate stratification mechanism that uses a combination of the keys 402 and 404, stratifications would have field values corresponding to attribute values of both "A" and "D," both "A and "E," both "A" and "G," both "B" and "D," and so on.

In some embodiments, the candidate stratification mechanism testing engine 304 may identify and/or exclude outliers or abnormalities, either before or after the testing of the candidate stratification mechanisms. In some embodiments, if outliers are excluded after the testing of the candidate stratification mechanisms, outliers may include field values that deviate by more than a threshold amount relative to a median value. In some embodiments, if abnormalities are excluded before the testing of the candidate stratification mechanisms, such outliers may include field values indicating a discount exceeding a threshold amount or proportion and/or a discount for a longer than threshold duration, or a negative discount.

In some embodiments, the candidate stratification mechanism testing engine 304 may identify, by clusters of field values, specific factors that cause the determine value (e.g., the median value) to change. These factors may include specific subscribers, product types, and/or date ranges.

Figure 5:
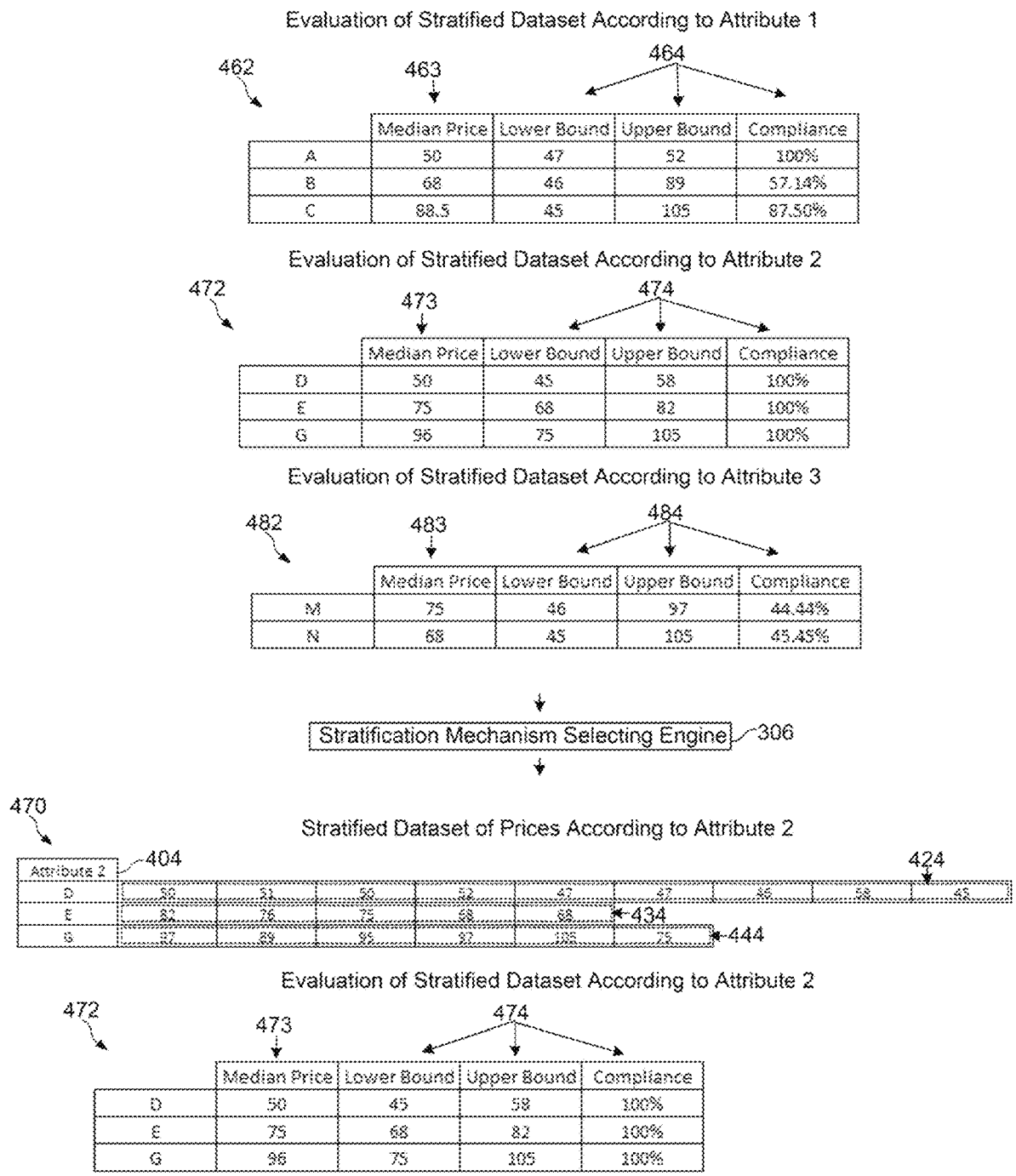
FIG. 5 is a diagram illustrating an example implementation of a stratification mechanism selecting engine of FIG. 3, in accordance with some embodiments of the present invention.

FIG. 5 is an exemplary illustration of an implementation of the stratification mechanism selecting engine 306, in accordance with some embodiments of the present invention. Principles of FIG. 5 may be implemented in conjunction with principles illustrated in FIGS. 2, 3, 4A-4C, and vice versa. In FIG. 5, the stratification mechanism selecting engine 306 may select one or more particular stratification mechanisms, of the candidate stratification mechanisms tested and evaluated in FIGS. 4A-4C. The selection criteria may be based on whether a candidate stratification mechanism satisfies the constraints, and/or may be based on one or more top performing metrics of the candidate stratification mechanisms. The selection criteria may be based on a candidate stratification mechanisms that uses a minimum number of stratifications (e.g., resulting in a least number of stratifications and/or utilizing a least number of attributes or keys). The stratification mechanism selecting engine 306 may select the candidate stratification mechanism that uses the identifier 404 as a key, according to a comparison between the evaluations 462, 472, and 482, because of its highest compliance rate compared to other candidate stratification mechanisms. The stratification mechanism selecting engine 306 may resolve conforming SSP values of 50, 82, and 97 from the selected stratification mechanism.

In some embodiments, the stratification mechanism selecting engine 306 may receive feedback to override a selected particular stratification mechanism, and/or a determined value from the selected particular stratification mechanism. The feedback to override the selected particular stratification mechanism may include an indication of an updated resolved value (e.g., an updated SSP). The candidate stratification mechanism testing engine 304 may recompute the compliance rate and/or other metrics within the selected particular stratification mechanism using the updated determined value.

Figure 6A:
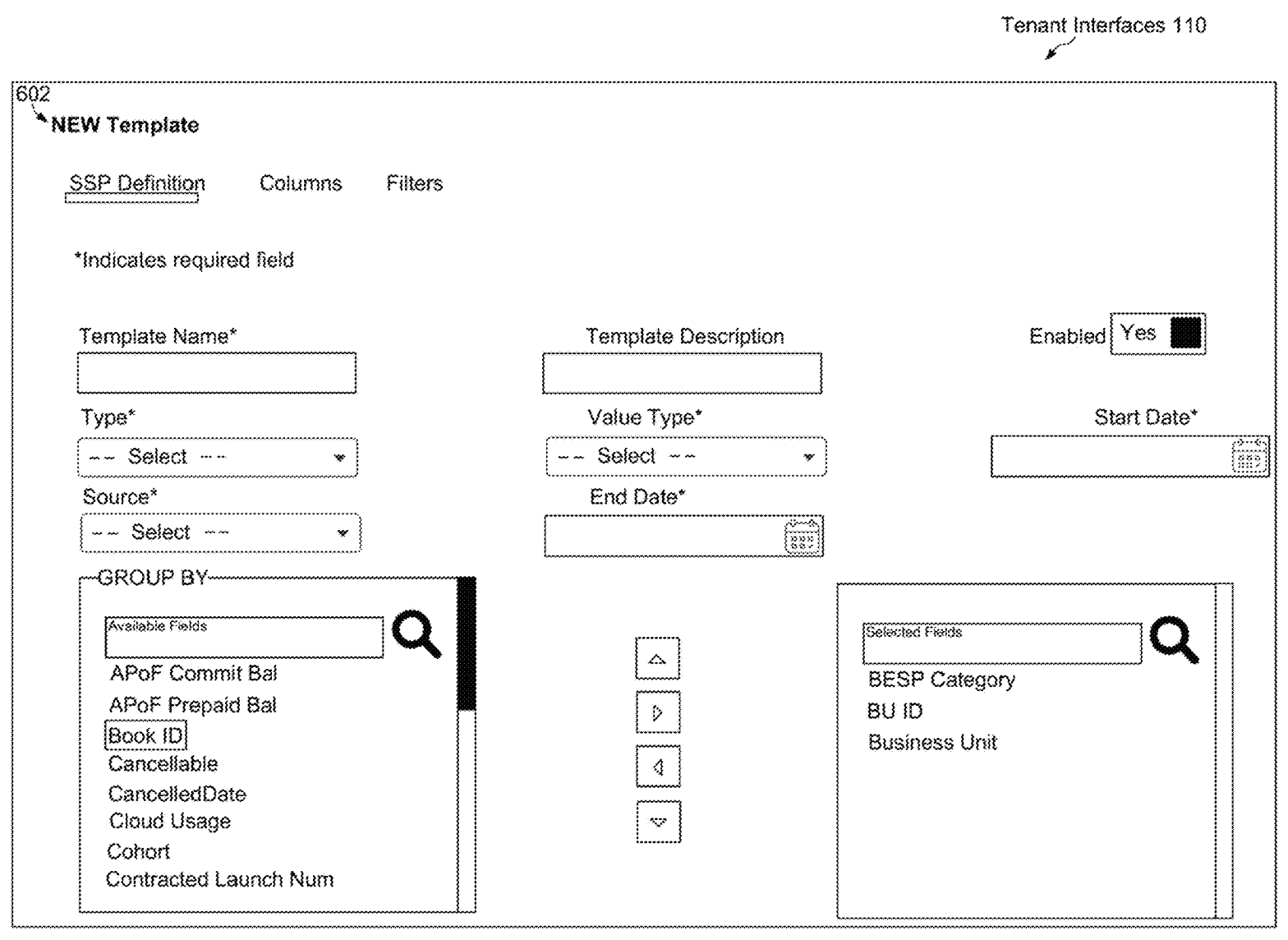
Figure 6B:
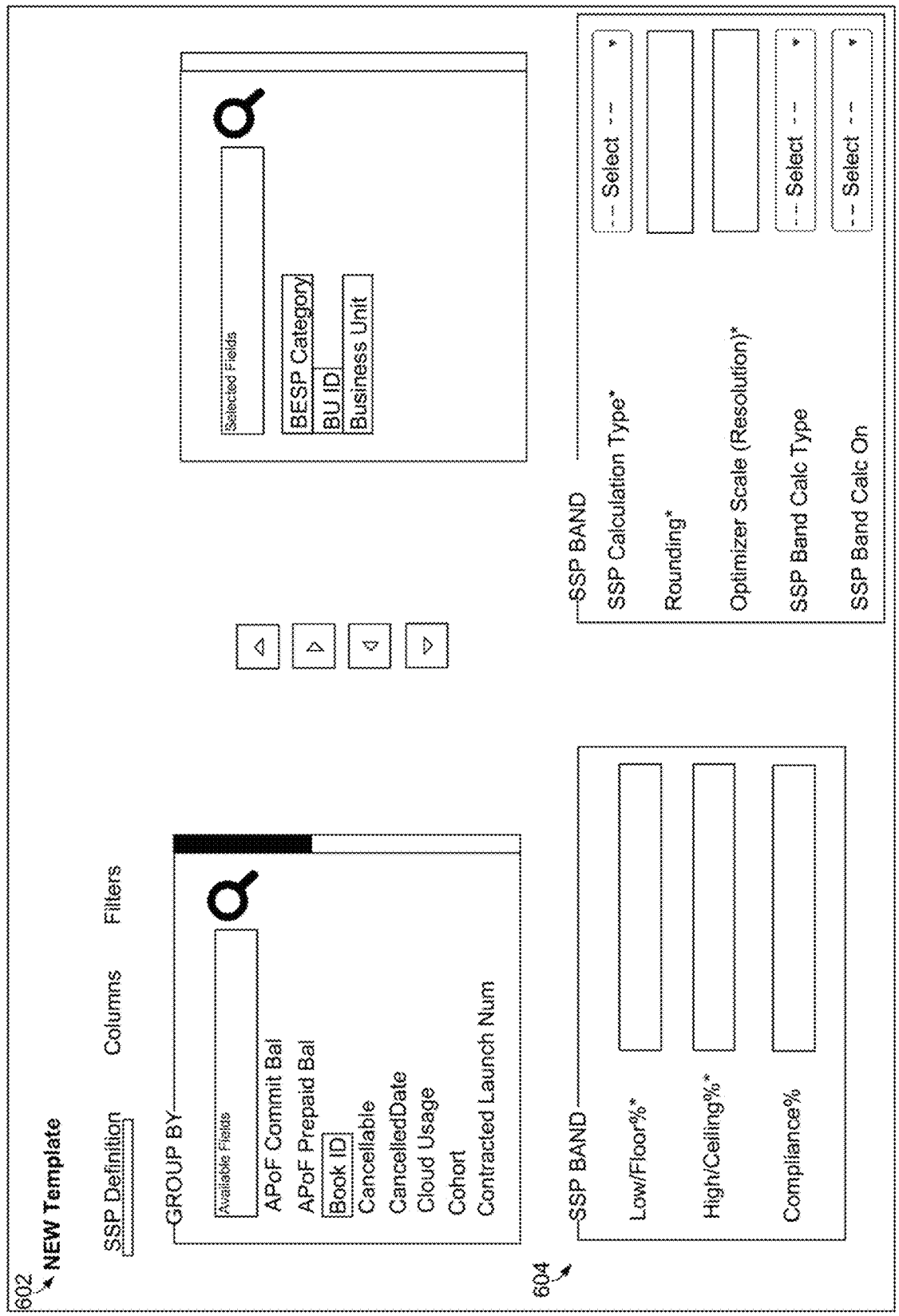

FIGS. 6A-6D illustrate example tenant interfaces, in accordance with some embodiments of the present invention. FIGS. 6A-6B illustrates a template 602 within the tenant interface 110, via which a tenant may define one or more parameters of the candidate stratification mechanisms, and/or of the stratification selection. These parameters may include whether the determination of a median value (e.g., of an SSP) is based on an amount or a percentage, an effective start date, a source data view of the original dataset (e.g., in some embodiments the dataset 400 of FIG. 4), a calculation type indicating a method of calculating the median value, rounding parameters, and a resolution indicative of a level of accuracy of the determination of the median value. In some embodiments, the template 602 may also be used to define a schema mapping within a dataset, to indicate locations (e.g., rows or columns) corresponding to keys. In some embodiments, the template 602 may also be used to define filter parameters, including filtering of outlier field values.

The previously referred to calculation types may include a simple median based on transaction count or based on quantity count, and a modified calculation based on either transaction count or quantity count. A calculation type based on a transaction count means that each transaction represents a single quantity. A calculation type based on a quantity count means that a plural quantity indicated on a transaction is counted. For example, for a transaction line that indicates 10 items were sold in a single transaction, a calculation based on transaction count would represent this transaction as a count of 1. A calculation based on quantity count would represent this transaction as a count of 10. A simple median means a standard mathematical median of unit sell price or a discount percentage of a set of transactions recorded within a dataset. A modified calculation may include deriving a test bucket range based on any of the aforementioned parameters, counting a number of transactions that fall under each equally split test bucket, identifying a bucket or buckets with biggest numbers of transactions, and deriving the median value based on transaction data within the identified bucket or buckets.

In some embodiments, as illustrated in FIG. 6B, the template 602 may be used to define one or more constraints. FIG. 6B illustrates a constraint defining portion 604. These constraints may include a minimum value or range (e.g., within −20 percent of the median value) for a field value to be conforming, a maximum value or range (e.g., within +/−20 percent of the median value) for a field value to be conforming, and a required proportion of field values that are conforming within each stratification, or across a candidate stratification mechanism.

Figure 6D:
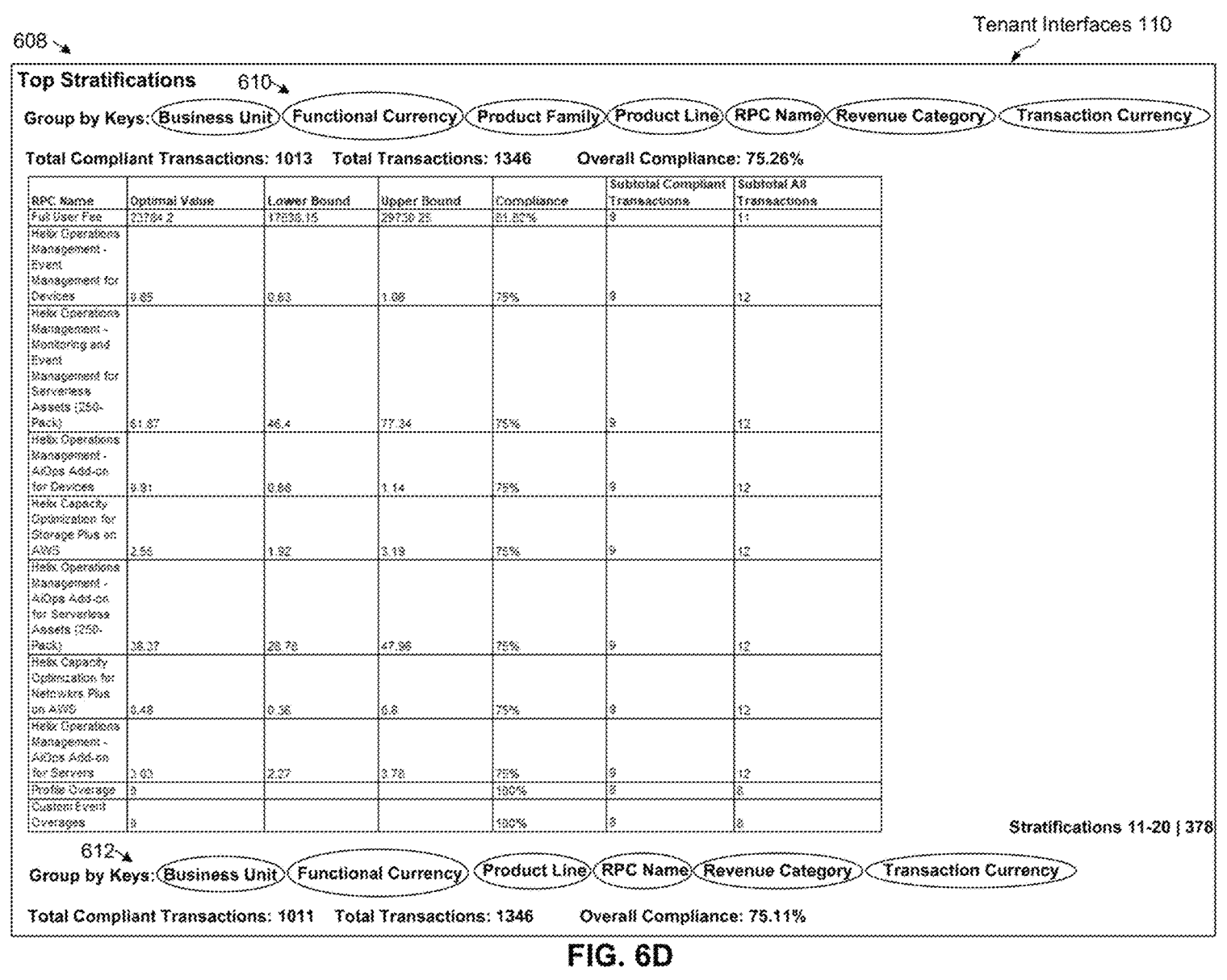

FIGS. 6C-6D illustrate an example report 608 generated within the tenant interfaces 110. The report 608 may correspond to one or more selected particular stratification mechanisms. FIGS. 6C and 6D illustrate a first selected particular stratification mechanism 610 and a second selected particular stratification mechanism 612.

Each record (e.g., row) may correspond to a different resource or a different market, and/or a different stratification. The report 608 may show a resolved value, such as an SSP, for each resource or market, under the "Optimal Value" column, and different keys that identify each resource, such as "Business Unit," "Functional Currency," "Product Family," "Product Line," "Revenue Category," "Revenue Contract Identifier," and/or "Transaction Currency." The report 608 also shows results of evaluations including a compliance rate, a number of compliant transactions, and a total number of transactions for each resource or stratification. In some embodiments, the report 608 may link to external files or documents, such as a contract associated with a transaction. In some embodiments, the report 608 may link to or be integrated with other tools such as quoting tools or forecasting tools.

Figure 6E:
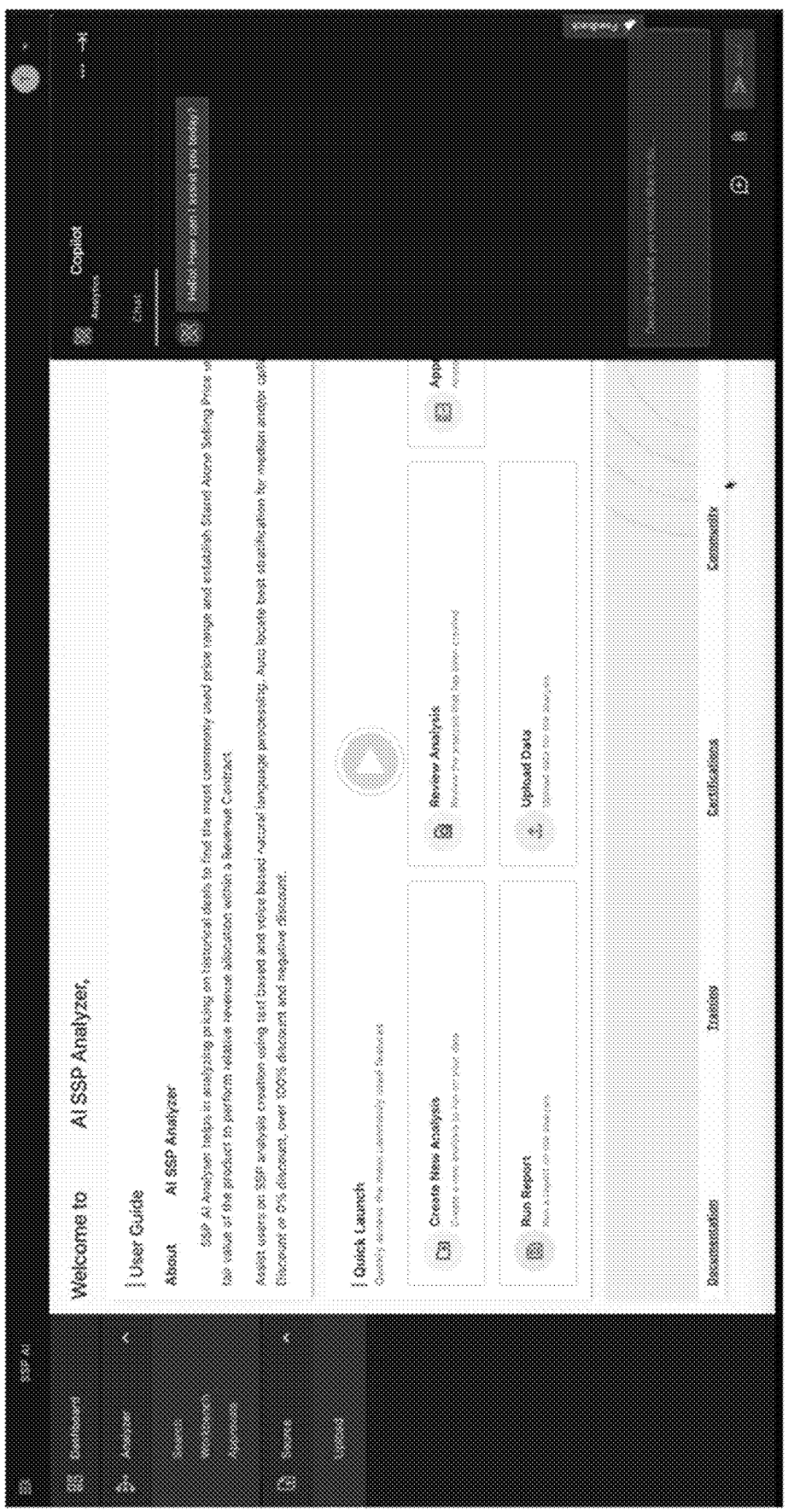
FIGS. 6E-6F are diagrams illustrating example implementations of tenant interfaces, which are used to define parameters in order to output an SSP, in accordance with some embodiments of the present invention.
Figure 6F:
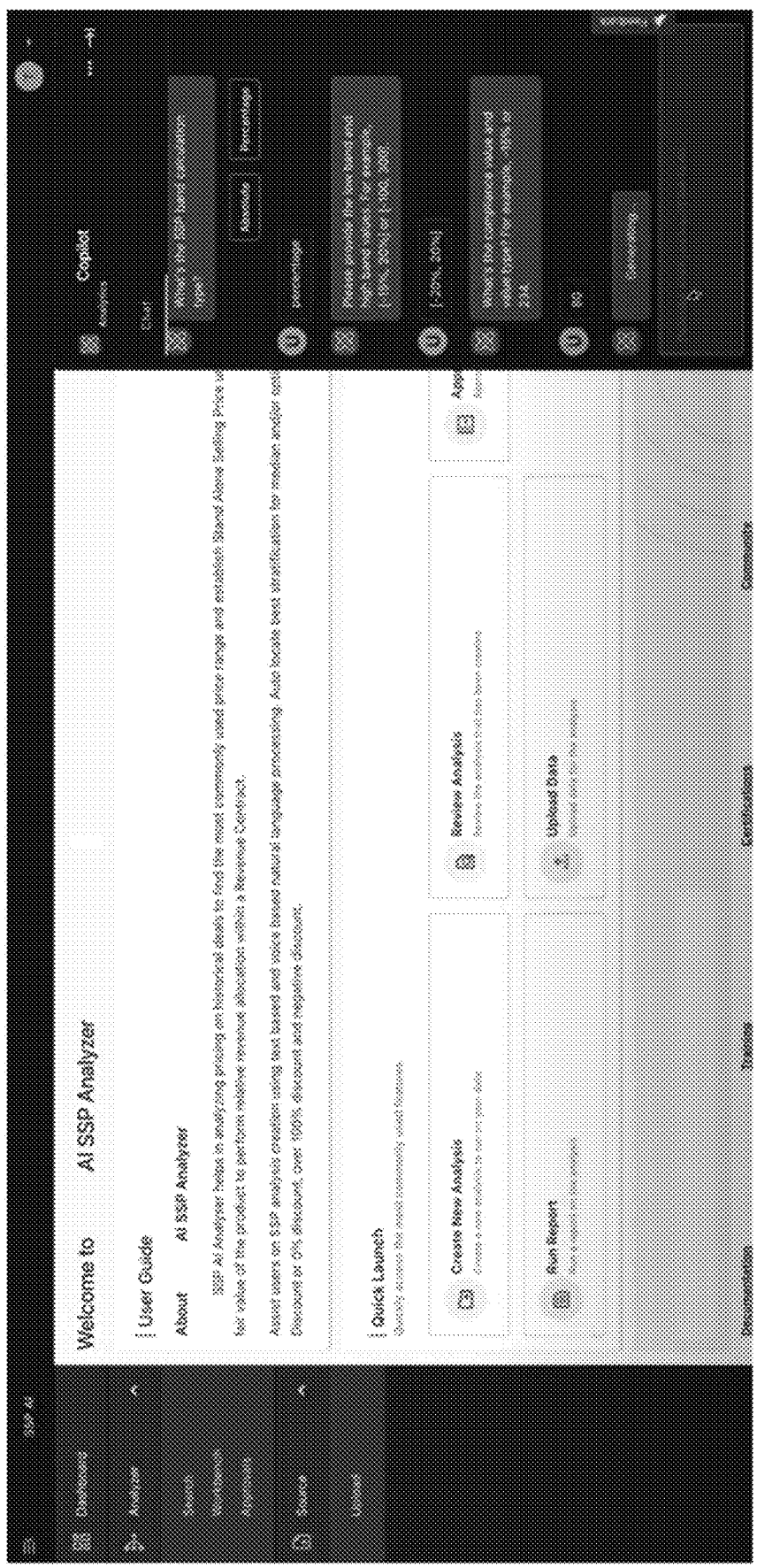

FIGS. 6E-6F illustrates an example dashboard used to define one or more parameters in order to output an SSP. In FIGS. 6E-6F, one or more parameters may be inputted via a machine learning or artificial intelligence (AI) copilot, such as low band values, high band values, compliance values, and/or value types.

Figure 6G:
FIG. 6G is a diagram illustrating an example implementation of a tenant interface, which is used to select stratifications in order to output one or more SSPs, in accordance with some embodiments of the present invention.

FIG. 6G illustrates an example dashboard used to select one or more stratifications for SSP analysis.

Figure 7:
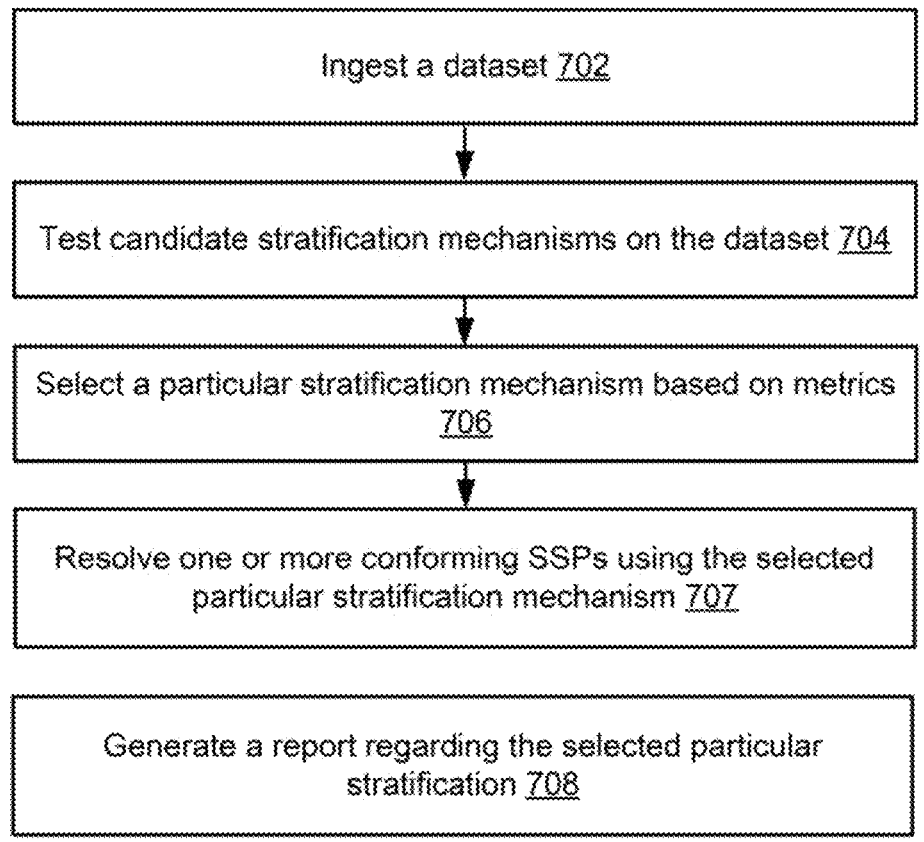
FIG. 7 is a flowchart that illustrates a method of ingesting a dataset, testing candidate stratification mechanisms on the dataset, and selecting one or more particular candidate stratification mechanisms on the dataset, in accordance with some embodiments of the present invention.

FIG. 7 is a flowchart of a method 700 of testing candidate stratification mechanisms and selecting one or more particular stratification mechanisms. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

The method 700 begins with one or more hardware processors (e.g., the dataset ingesting engine 202 of FIG. 2) ingesting a dataset (e.g., the dataset 400 of FIG. 4) in step 702. The dataset ingesting engine 202 may ingest the dataset via one or more APIs or other interfaces such as the tenant interfaces 110. The dataset ingesting engine 202 may normalize the ingested dataset. In some embodiments, the normalizing of the ingested dataset may include converting non-tabular portions into a tabular format, and/or vectorizing the dataset into a column or row vector to facilitate testing of candidate stratification mechanisms. In some embodiments, the normalizing of the dataset may include removing any duplicate fields or field values.

In step 704, the candidate stratification mechanism testing engine 304 may test and evaluate candidate stratification mechanisms on the ingested dataset. First, the candidate stratification mechanism testing engine 304 may obtain constraints pertaining to the ingested dataset and/or to the candidate stratification mechanisms to be tested on the dataset. These constraints may include or indicate a schema mapping of locations of different keys (e.g., the keys 402, 404, and 406 in FIGS. 4A, 4B, 4C) indicating attributes within the dataset, any specific keys that are used for the candidate stratification mechanisms, any divisions of the dataset prior to stratification, and/or how the candidate stratification mechanisms are to be evaluated. The constraints regarding evaluation of the candidate stratification mechanisms may include a minimum permitted field value for conformance, a maximum permitted field value for conformance, and a required proportion of conforming fields. The minimum permitted field value and/or the maximum permitted field value may be defined as a percentage deviation from a test value (e.g., a median value) determined for a particular stratification within a candidate stratification mechanism.

The candidate stratification mechanism testing engine 304 may generate one or more stratified datasets (e.g., the stratified datasets 460, 470, 480 in FIGS. 4A-4C) according to different candidate stratification mechanisms. The different candidate stratification mechanisms may use different keys (e.g., the keys 402, 404, and 406 in FIGS. 4A, 4B, 4C), indicative of different attributes, as a basis to stratify the dataset. For each stratification within a stratified dataset, the candidate stratification mechanism testing engine 304 may determine a test value, such as a median value of the field values. The candidate stratification mechanism testing engine 304 may evaluate metrics including a lower bound of the field values within each stratification, an upper bound of the field values, and a compliance rate indicating a proportion of the field values within each stratification that are conforming (e.g., within a threshold percentage range of the median value).

In step 706, the stratification mechanism selecting engine 306 may select one or more particular candidate stratification mechanisms based on satisfying the constraints, and/or based on highest performing metrics and/or a lowest number of stratifications. Highest performing metrics may refer to highest compliance rates of the one or more particular candidate stratification mechanisms compared to other unselected candidate stratification mechanisms.

In step 708, the report generating engine 206 may generate a report that includes an evaluation of median values of each stratification, and/or the metrics for each stratification.

Figure 8:
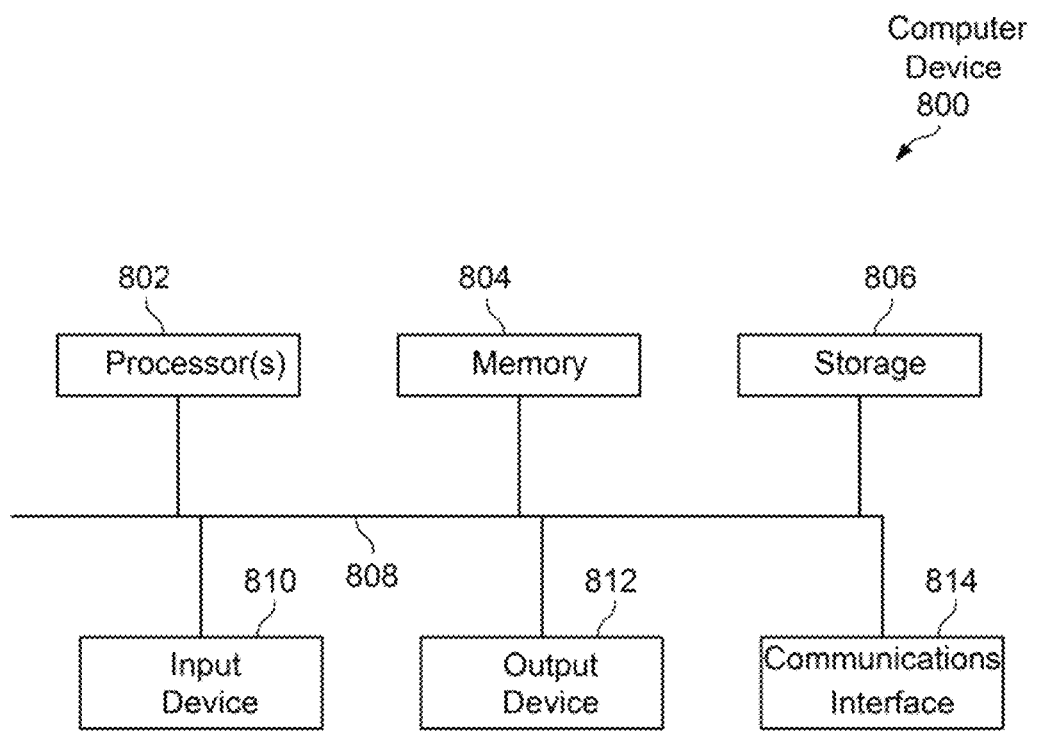
FIG. 8 is a block diagram illustrating details of a computing system.

FIG. 8 is a block diagram of a computing device 800. Any of the systems, engines, datastores, and/or networks described herein may comprise an instance of one or more computing devices 800. In some embodiments, functionality of the computing device 800 is improved to perform some or all of the functionality described herein. The computing device 800 comprises a processor 802, memory 804, storage 806, an input device 810, a communication network interface 814, and an output device 812 communicatively coupled to a communication channel 808. The processor 802 is configured to execute executable instructions (e.g., programs). In some embodiments, the processor 802 comprises circuitry or any processor capable of processing the executable instructions.

The memory 804 stores data. Some examples of memory 804 include storage devices, such as RAM, ROM, RAM cache, virtual memory, etc. In various embodiments, working data is stored within the memory 804. The data within the memory 804 may be cleared or ultimately transferred to the storage 806.

The storage 806 includes any storage configured to retrieve and store data. Some examples of the storage 806 include flash drives, hard drives, optical drives, cloud storage, and/or magnetic tape. In some embodiments, storage 806 may include RAM. Each of the memory 804 and the storage 806 comprises a computer-readable medium, which stores instructions or programs executable by processor 802.

The input device 810 may be any device that inputs data (e.g., mouse and keyboard). The output device 812 may be any device that outputs data and/or processed data (e.g., a speaker or display). It will be appreciated that the storage 806, input device 810, and output device 812 may be optional. For example, the routers/switchers may comprise the processor 802 and memory 804 as well as a device to receive and output data (e.g., the communication network interface 814 and/or the output device 812).

The communication network interface 814 may be coupled to a network (e.g., the network system 100) via the link 808. The communication network interface 814 may support communication over an Ethernet connection, a serial connection, a parallel connection, and/or an ATA connection. The communication network interface 814 may also support wireless communication (e.g., 802.11 a/b/g/n, WiMax, LTE, WiFi). It will be apparent that the communication network interface 814 may support many wired and wireless standards.

It will be appreciated that the hardware elements of the computing device 800 are not limited to those depicted. A computing device 800 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 802 and/or a co-processor located on a GPU (i.e., NVidia).

It will be appreciated that an "engine," "system," "datastore," and/or "database" may comprise software, hardware, firmware, service, microservice, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance. It will be appreciated that the term "request" shall include any computer request or instruction, whether permissive or mandatory.

The databases/datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A multi-tenant system, comprising:
one or more hardware processors; and
memory storing computer instructions, the computer instructions when executed by the one or more hardware processors configured to perform:
  ingesting a dataset comprising transaction records, each of the transaction records comprising a field value and attribute values of different attributes;
  testing candidate stratification mechanisms on the dataset, each candidate stratification mechanism stratifying the dataset according to a different attribute;
  determining a test value from field values for each attribute value within each stratification of each candidate stratification mechanism;
  evaluating each candidate stratification mechanism based on one or more metrics following stratification according to the candidate stratification mechanism on the dataset, the one or more metrics indicating a proportion of conforming field values that are within a threshold range of a corresponding test value;
  selecting a particular stratification mechanism from the candidate stratification mechanisms based on the one or more metrics;
  stratifying the dataset according to the particular stratification mechanism;
  resolving one or more conforming values from the stratified dataset, the resolving comprising resolving a median value from the field values within each stratification of the selected particular stratification mechanism, the proportion of conforming field values being determined based on one or more constraints indicating a permitted range of deviations of each of the field values from the resolved median value within each stratification;

receiving an indication of an override of a resolved median value to a modified median value; and recomputing the one or more metrics based on the modified median value.

2. The multi-tenant system of claim 1, further comprising normalizing the ingested dataset.

3. The multi-tenant system of claim 1, wherein the testing of the candidate stratification mechanisms is based on a genetic algorithm.

4. The multi-tenant system of claim 1, wherein the computer instructions when executed by the one or more hardware processors are further configured to perform:

obtaining locations of different attributes within the dataset from a schema mapping.

5. The multi-tenant system of claim 1, wherein the instructions when executed by the one or more hardware processors are further configured to perform:

removing one or more outliers from the ingested dataset according to one or more clustering algorithms prior to the testing of the candidate stratification mechanisms.

6. The multi-tenant system of claim 1, wherein each transaction record corresponds to a row, the field value corresponds to a column within the row, and the attribute values correspond to different columns within the row.

7. A method implemented by a multi-tenant system, the method comprising:

ingesting a dataset comprising transaction records, each of the transaction records comprising a field value and attribute values of different attributes;

testing candidate stratification mechanisms on the dataset, each candidate stratification mechanism stratifying the dataset according to a different attribute;

determining a test value from field values for each attribute value within each stratification of each candidate stratification mechanism;

evaluating each candidate stratification mechanism based on one or more metrics following stratification according to the candidate stratification mechanism on the dataset, the one or more metrics indicating a proportion of conforming field values that are within a threshold range of a corresponding test value;

selecting a particular stratification mechanism from the candidate stratification mechanisms based on the one or more metrics;

stratifying the dataset according to the particular stratification mechanism;

resolving one or more conforming values from the stratified dataset, the resolving comprising resolving a median value from the field values within each stratification of the selected particular stratification mechanism, the proportion of conforming field values being determined based on one or more constraints indicating a permitted range of deviations of each of the field values from the resolved median value within each stratification;

receiving an indication of an override of a resolved median value to a modified median value; and recomputing the one or more metrics based on the modified median value.

8. The method of claim 7, further comprising normalizing the ingested dataset.

9. The method of claim 7, wherein the testing of the candidate stratification mechanisms is based on a genetic algorithm.

10. The method of claim 7, further comprising:

obtaining locations of different attributes within the dataset from a schema mapping.

11. The method of claim 7, further comprising:

removing one or more outliers from the ingested dataset according to one or more clustering algorithms prior to the testing of the candidate stratification mechanisms.

12. The method of claim 7, wherein each transaction record corresponds to a row, the field value corresponds to a column within the row, and the attribute values correspond to different columns within the row.

* * * * *